United States Patent [19]

Atkins et al.

[11] 4,364,829

[45] Dec. 21, 1982

[54] OIL FILTER WITH TURN ATTACHMENT

[76] Inventors: Donald A. Atkins, 114 Morningside Dr., Nolanville, Tex. 76559; Marilyn M. Atkins, Colorado Springs, Colo.

[21] Appl. No.: 279,665

[22] Filed: Jul. 1, 1981

[51] Int. Cl.³ .............................................. B01D 27/08
[52] U.S. Cl. .................................. 210/238; 210/443; 210/470; 210/541; 210/DIG. 17
[58] Field of Search ............ 81/90 B, 90 C; 210/168, 210/232, 238, 443, 444, 464, 465, 470, 471, DIG. 17, 541, 542, 237, 244–246

[56] References Cited

U.S. PATENT DOCUMENTS

| D. 258,636 | 3/1981 | Boyko | 81/90 B |
|---|---|---|---|
| 2,909,090 | 10/1959 | Moore | 81/90 B |
| 3,121,355 | 2/1964 | Morel | 81/90 B |
| 3,240,086 | 3/1966 | Way | 81/90 B |
| 3,279,609 | 10/1966 | Francois | 210/443 |
| 3,354,757 | 11/1967 | Grimm | 81/90 B |
| 3,473,666 | 10/1969 | Humbert | 210/232 |
| 3,710,930 | 1/1973 | Owdom | 210/238 |
| 4,126,555 | 11/1978 | Adams | 210/238 |
| 4,266,452 | 5/1981 | Crist | 81/90 B |

FOREIGN PATENT DOCUMENTS 962066  4/1957  Fed. Rep. of Germany ...... 210/238

*Primary Examiner*—Ernest G. Therkorn
*Attorney, Agent, or Firm*—Blair, Brown & Kreten

[57] ABSTRACT

An oil filter suitably formed to provide integrally therewith a turning attachment to facilitate the interchanging of oil filters on engines and the like which include an oil filter canister. In the preferred form the filter body has substantially cylindrical configuration, upon which an interlocking instrument is disposed on an outer surface thereof. Various forms of the invention provide an interengaging implement to coact with the interlocking instrument selectively so that the oil filter canister can be rotated in either direction along its longitudinal axis by means of lever bars which in one form are affixed to the interengaging implement and pivoted thereto so that when not in use, the lever bars can be folded to reside substantially parallel to the outer annular walls of the canister.

9 Claims, 9 Drawing Figures

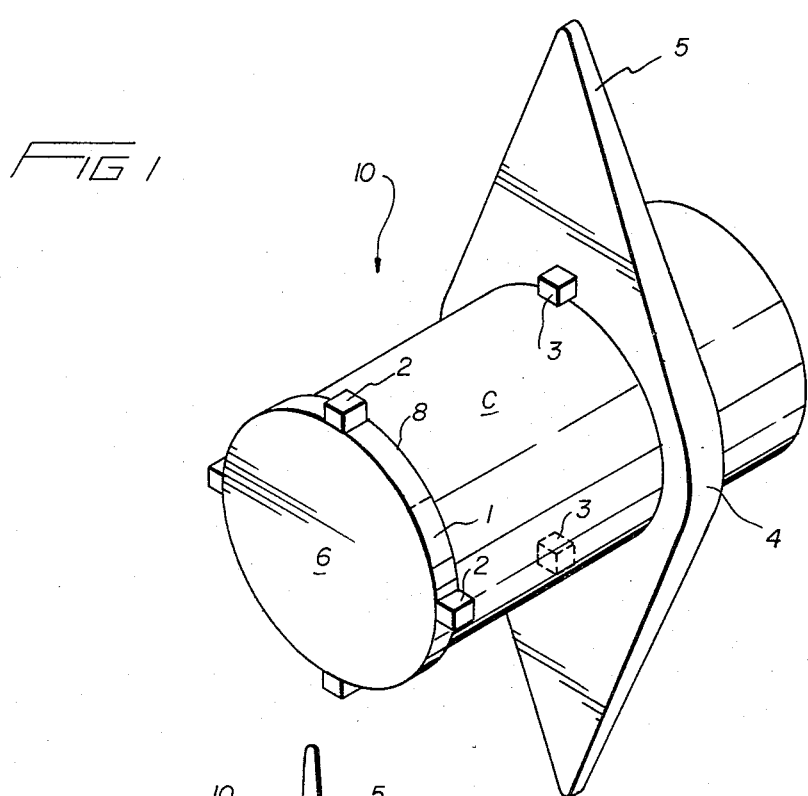
FIG 1
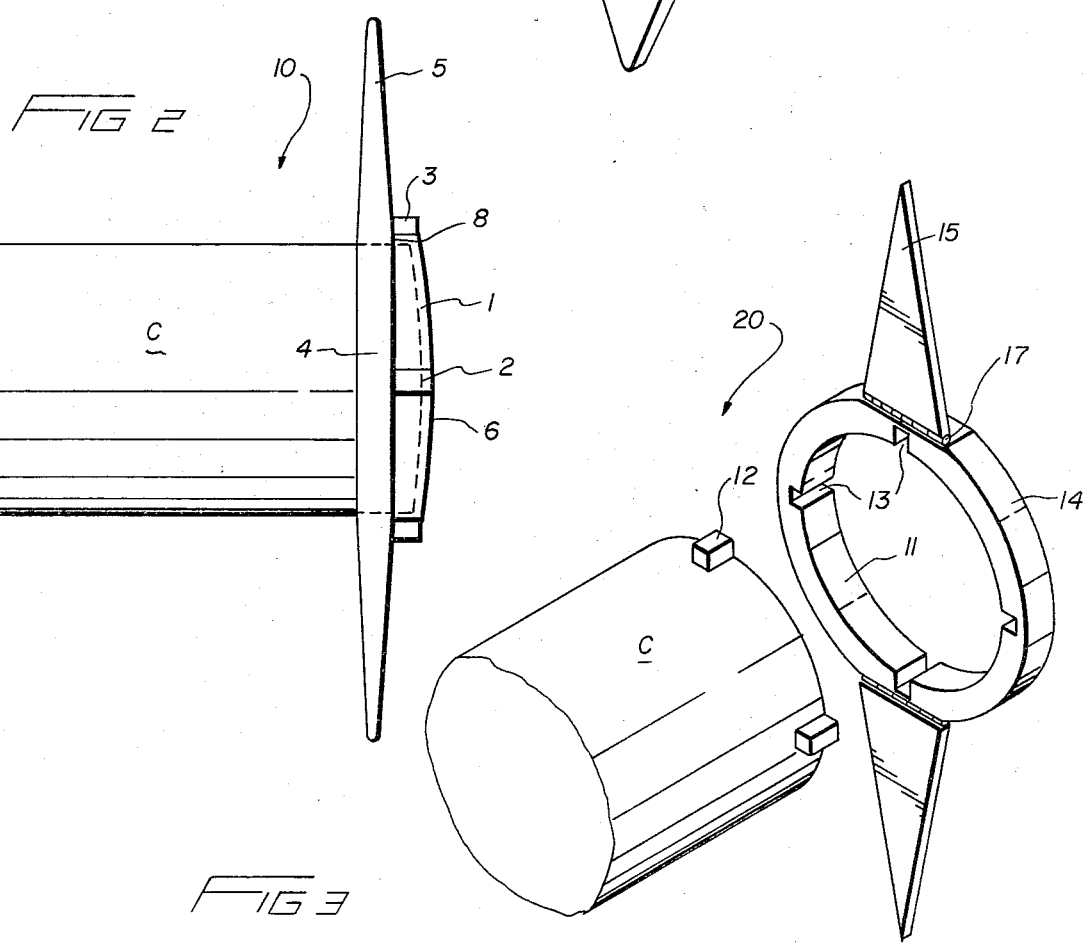
FIG 2
FIG 3

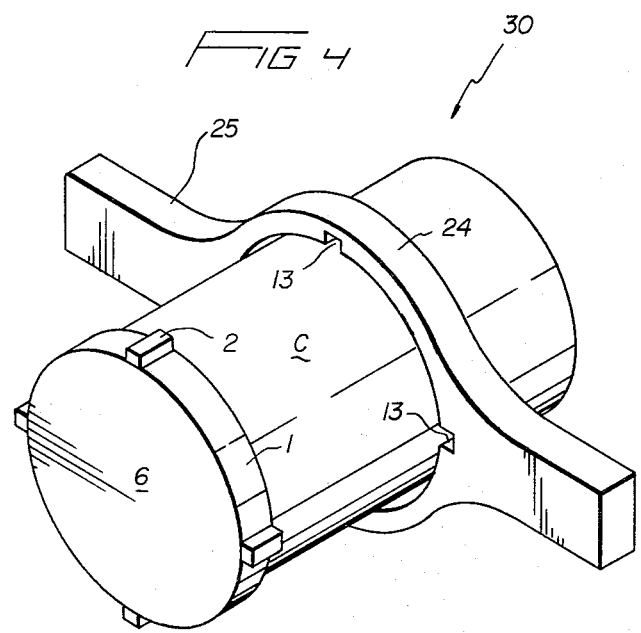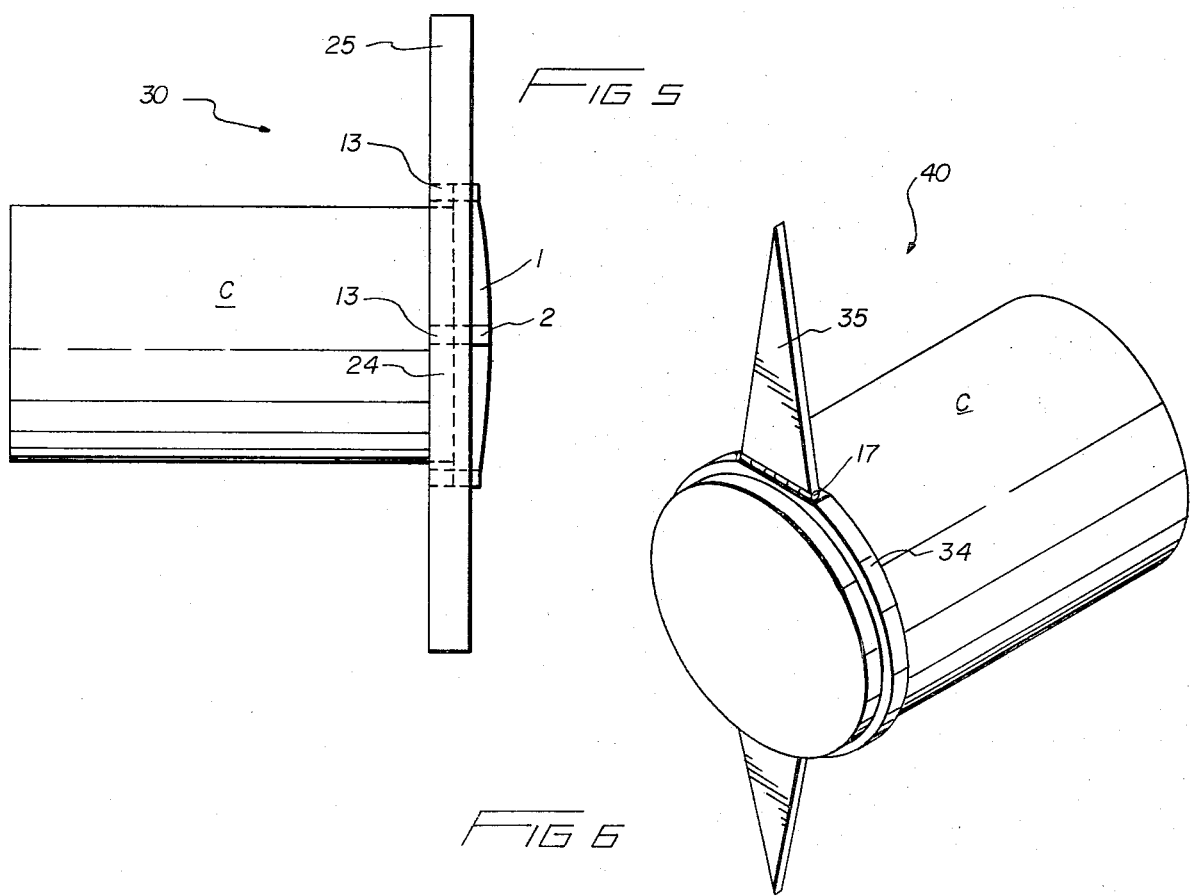

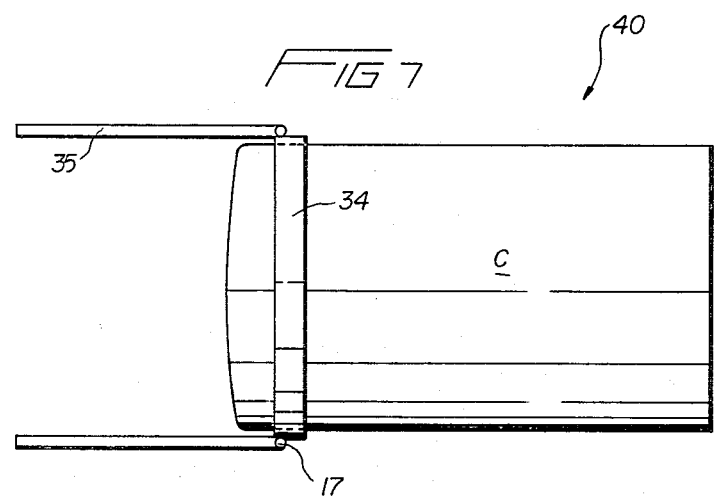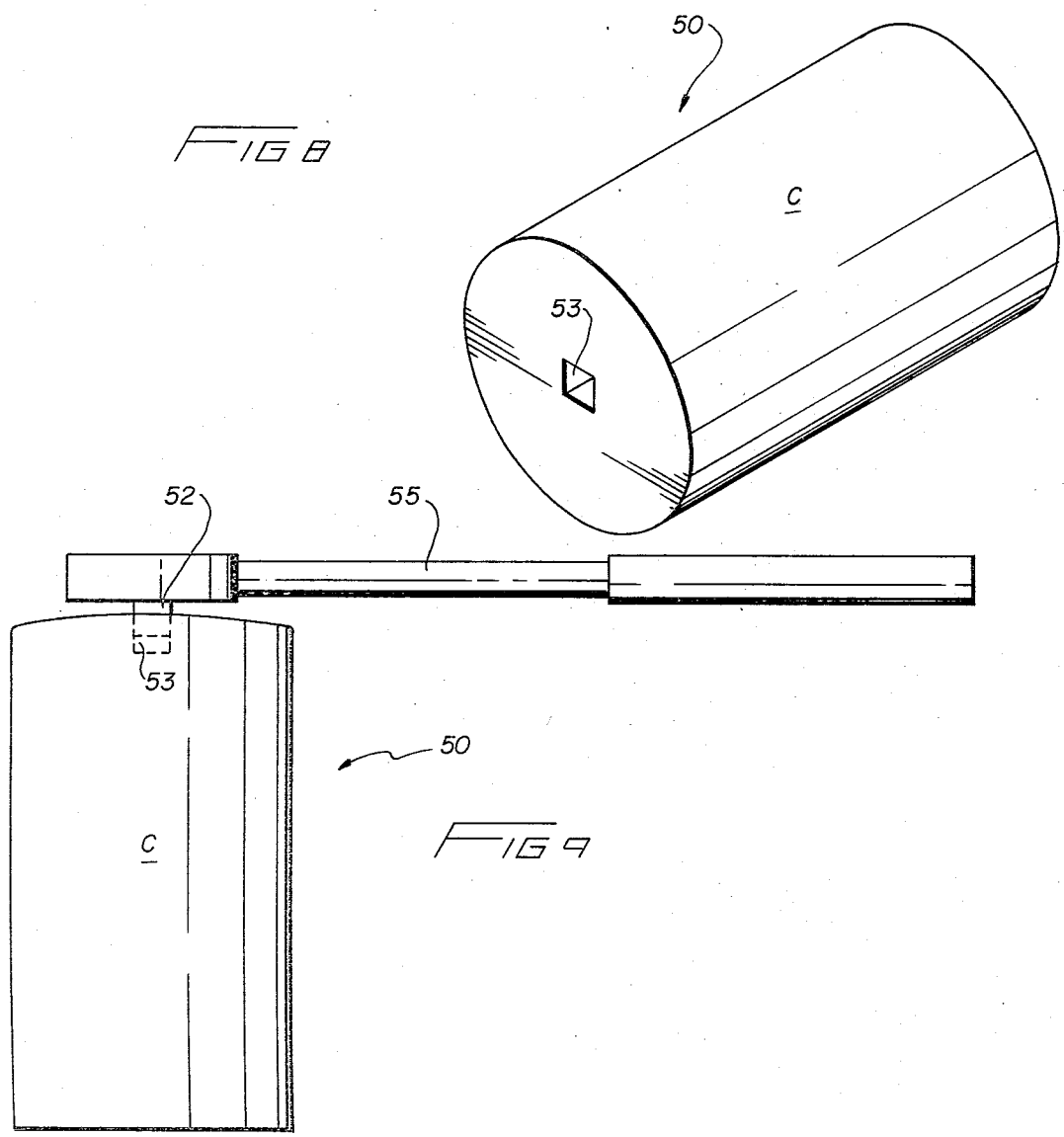

OIL FILTER WITH TURN ATTACHMENT

BACKGROUND OF THE INVENTION

This invention relates generally to oil filter canisters having attachments carried on the oil filter canister body for facilitating the turning and removing of these canisters. It has long been acknowledged that the cleaner the motor oil in an engine, the greater the likelihood of longer engine life since pollutants and contaminants contained in the engine oil, when removed frequently will provide a lubricating oil which reduces friction. Even with the advent of the so called long distance oils, particulate matter contained therewithin should be removed on a regular basis so that these particles are not carried in the oil, thereby increasing the efficiency of the engine.

The following references appear to reflect the state of the art of which applicant is aware in so far as these patents appear germane to the patent process, and in so far as they appear to relate to the inventive essence according to the present application.

| | |
|---|---|
| 2,909,090 Moore | 3,473,666 Humbert, Jr. |
| 3,121,355 Morel et al. | 3,710,930 Owdom |
| 3,279,609 Francois | |

Of these references, the patents to Moore, and Morel et al. are of interest as they teach respectively the use of a socket wrench and a radiator cap removing device in which a few isolated components share a coincidental structural similarity with various isolated components within the instant application.

However, none of these references teach the new and novel use in combination of elements in the environment set forth hereinafter and defined as turning attachments for oil filters, and neither do they provide the unexpected benefits and advantages associated therewith.

SUMMARY AND OBJECTS OF THE INVENTION

Accordingly, it is an object of this invention to provide a new and novel turning attachment carried on an oil filter which eliminates the inconveniences associated with the prior art devices.

It is yet a further object of this invention to provide a device of the character described above which is relatively inexpensive to manufacture, extremely durable in construction, and safe to use.

It is still a further object of the invention to provide a device of the character described above which when stored and still carried on the oil canister, is relatively inobtrusive, does not interfer with other moving parts or functions of the engine and yet can be readily deployed.

These objects are obtained, and other related objects will be made manifest when considering the ensuing description of the invention wherein a device is provided for interchanging oil filters on engines or the like which includes an oil filter canister having an outer surface with at least one interlocking means disposed thereon, and an interengaging means is operatively associated with the interlocking means including at least one lever bar which is carried on the canister so that when the interengaging means coacts with the interlocking means the oil filter canister can be rotated about a longitudinal axis thereof by the lever bar so as to provide the capability of rapidly changing oil filter canisters without the need for carrying associated specialized tools.

BRIEF DESCRIPTION OF THE DRAWING FIGURES

FIG. 1 is a perspective view of one form of the apparatus according to the present invention;

FIG. 2 is a side view thereof;

FIG. 3 is a perspective view of a second form of the invention;

FIG. 4 is a perspective view of a third form of the invention;

FIG. 5 is a side view thereof;

FIG. 6 is a perspective view of a fourth form of the invention;

FIG. 7 is a side view thereof;

FIG. 8 is a perspective view of an oil filter canister according to a fifth form of the invention; and FIG. 9 is a side view thereof along with the interengaging means to facilitate the deployment of the canister.

BRIEF DESCRIPTION OF THE PREFERRED EMBODIMENT

Referring to the drawings now wherein like reference numerals refer to like parts throughout the various drawing figures, reference numeral 10 is directed to a device for interchanging oil filters on engines or the like according to one form thereof.

The device 10 includes an oil filter canister C which in a preferred form is of substantially cylindrical configuration having one closed end wall, an end wall opposed therefrom adapted to be placed in registry with an engine inlet and outlet operatively connected to an oil passageway (not shown). The device includes, proximate to the closed end of the oil filter canister, an interlocking area including a band portion 1 adapted to gird the canister along an annular outer surface thereof, the band portion terminating along an end wall of the cylindrical canister, and including an end cap 6 adapted to overlie the end of the canister. Extending radially outwardly along portions of the band, a plurality of keys 2 are provided, these keys in a preferred form conveniently described as being of substantially rectangular configuration.

An interengaging area is provided which includes a sleeve 4 adapted to translate along the annular outer surface of the canister, but suitably dimensioned to be constrained from removal from the canister by the abutment 8 formed by the band 1 where is meets the canister C. Extending towards the keys 2 the sleeve 4 is provided with teeth 3 also of substantially rectangular configuration adapted to engage and work against the keys 2 as will now be described. Once the sleeve 4 is translated proximate to the band 1, the sleeve is rotated so that the teeth 3 are juxtaposed and placed next to the keys 2, so that rotation of the sleeve will provide a bearing load against the keys. To assist in the rotation, a plurality of lever bars 5 are provided extending outwardly from the sleeve. In the preferred form, the lever bars 5 are provided in plural form, and two are shown in FIG. 1, each diametrically opposed from the other, radiating outwardly from a longitudinal axis of the canister, and tapering to a point, so that a planar view of the sleeve with the lever bars would be substantially diamond shaped configuration.

FIG. 3 teaches the use of a similar device, in which the second form of the device 20 may be defined as a plurality of keys 12 disposed directly on the canister C without the use of the band in the previous example, and the keys, being of substantially rectangular configuration are most beneficially disposed on an outer annular periphery of the canister, all in cross-sectional alignment. A sleeve 14 is adapted to be slidably disposed over the canister, and a plurality of keyways 13 are disposed on an annular inner surface 11 of the sleeve 14. The keyways 13 are appropriately dimensioned to allow the slidable insertion therein of the keys 12, so that when thusly aligned, rotation of the sleeve will rotate the oil filter canister. To assist in this rotation, a plurality of lever arms 15 are provided somewhat similar to the arms of FIG. 1, and as shown in FIG. 3 two such lever bars are provided in diametrically opposed relationship, of substantially triangular configuration, and affixed to an outer surface of the sleeve 14 by means of hinges 17. When thusly fabricated, the sleeve is allowed to be kept on the canister at all times, and for compactness and use in storage, the lever bars 15 are folded to align with the longitudinal axis of the canister.

FIGS. 4 and 5 shown a third from of the device 30 which may be regarded as somewhat of a composite of the first two discussed embodiments. Specifically, the canister C, similar to FIG. 1 has a band 1, a plurality of keys 2 disposed thereon, and an end cap 6 as described hereinbefore. Additionally, a sleeve 24 is provided with a plurality of keyways 13 suitably dimensioned to allow the slidable insertion of the keys therewithin, and the sleeve 24 is provided with outwardly extending lever bars 25, diametrically opposed, and of substantially rectangular configuration. These lever bars could similarly be hinged as shown in FIG. 3.

FIGS. 6 and 7 teach the use of a fourth embodiment of the device 40 in which the canister C is provided with a band 34 frictionally fit or integral with the canister to remain thereon at all times, and a hinge 17 attaches the diametrically opposed lever bars 35, which are preferably of triangular shape.

FIGS. 8 and 9 teach the use of a fifth form of the device 50 in which the canister C is provided with a rectangular recess 53 along an end wall remote from the engine adapted to receive the socket plug 52 of a rachet wrench 55. In use and operation, the socket plug 52 is frictionally disposed in the recess 53 and the rachet 55 is rotated to facilitate the removal of the canister.

FIGS. 6 and 7, the arms are rotated and deployed as shown in FIG. 6, and the canister can be rotated in either direction. In FIGS. 1-5, the sleeve is disposed along the longitudinal axis of the canister until it engages the interlocking devices in the various forms, and then rotation by means of the lever bars provide the beneficial removal of the canister as described hereinbefore.

In view of the foregoing, it should be appreciated that there has been provided a device to facilitate the changing of oil filter canisters on engines or the like in which the canister has an outer surface with at least one interlocking means disposed thereon, and an interengaging means is operatively and selectively associated with the interlocking means and includes at least one lever bar is adapted to be selectively engageable therewith for the rapid replacement and removal of oil canisters.

Moreover, having thus described the invention, it should be apparent that numerous structural modifications are contemplated as being a part of this invention as set forth hereinabove and as defined hereinbelow by the claims.

What is claimed is:

1. A device for facilitating changing of oil filters on engines or the like comprising in combination:
   an oil filter canister of cylindrical configuration having an outer annular surface with at least one interlocking means fixed thereon,
   an interengaging means operatively associated with said interlocking means including at least one radially extending lever bar and permanently carried on said canister annular surface whereby when said interengaging means coacts with said interlocking means, said oil filter canister can be rotated about a longitudinal axis thereof by said lever bar.

2. The device of claim 1 wherein said interlocking means comprises a plurality of keys extending outwardly from an annular surface of said canister.

3. The device of claim 2 wherein said keys are supported on said canister through a band fashioned on said canister.

4. The device of claim 3 wherein said interengaging means comprises a sleeve formed with key ways to admit said keys.

5. The device of claim 3 wherein said interengaging means comprises a sleeve formed with teeth to slidably coact with said keys.

6. The device of claim 3 wherein said band includes a disc shaped end wall to overlie an end of said canister.

7. The device of claim 3 wherein said lever bar is formed of two ears diametrically opposed about said canister, including hinge means to fold said ears against said canister for compact storage.

8. The device of claim 3 wherein two said lever bars extend diametrically outwardly from said canister.

9. The device of claim 1 wherein said interlocking means includes a band fixed on an end portion said canister annular surface and said interengaging means includes a pair of diametrically opposed said lever hinged to said band.

* * * * *